United States Patent
Cui et al.

(10) Patent No.: US 7,264,886 B2
(45) Date of Patent: Sep. 4, 2007

(54) WATER REPELLENT COMPOSITIONS FOR WOOD PRESERVATIVES

(75) Inventors: Futong Cui, Charlotte, NC (US); Alan F. Preston, Charlotte, NC (US); Kevin J. Archer, Charlotte, NC (US); Paul Walcheski, Mt. Ulla, NC (US)

(73) Assignee: Viance, LLC, Charlotte, NC (US)

( * ) Notice: Subject to any disclaimer, the term of this patent is extended or adjusted under 35 U.S.C. 154(b) by 135 days.

(21) Appl. No.: 10/438,273

(22) Filed: May 14, 2003

(65) Prior Publication Data

US 2004/0011244 A1  Jan. 22, 2004

Related U.S. Application Data

(60) Provisional application No. 60/380,434, filed on May 14, 2002.

(51) Int. Cl.
*B32B 5/66* (2006.01)

(52) U.S. Cl. .................. 428/536; 428/537.1; 428/541; 427/294; 427/297; 427/298; 427/440; 427/441

(58) Field of Classification Search ............... 428/541, 428/536, 537.1; 427/294, 297, 298, 440, 427/441
See application file for complete search history.

(56) References Cited

U.S. PATENT DOCUMENTS

| | | | | |
|---|---|---|---|---|
| 4,612,255 A | * | 9/1986 | Hein | 428/541 |
| 4,681,910 A | * | 7/1987 | Crockatt et al. | 524/487 |
| 5,228,905 A | | 7/1993 | Grunewalder et al. | 106/2 |
| 5,695,551 A | | 12/1997 | Buckingham et al. | 106/2 |
| 6,274,199 B1 | * | 8/2001 | Preston et al. | 427/298 |

* cited by examiner

*Primary Examiner*—Leszek Kiliman
(74) *Attorney, Agent, or Firm*—McAndrews, Held & Malloy, Ltd.

(57) ABSTRACT

Water-based wax emulsions, optionally for use in conjunction with alkaline copper and/or quaternary ammonium based preservatives systems, are described. These emulsions are comprised of natural or synthetic wax, nonionic surfactants having HLB values greater than 11, anionic surfactants, and water. Certain emulsion compositions as described in this specification posses the unique property of maintaining emulsion stability in wood preservatives during extended use in typical wood treatment processes. Water-repellant wood treated with the wax emulsions are described. A method of treating wood, comprising providing wood and treating the wood with the wax emulsion under conditions effective to increase its water repellency is also disclosed.

11 Claims, No Drawings

WATER REPELLENT COMPOSITIONS FOR WOOD PRESERVATIVES

CROSS-REFERENCE TO RELATED APPLICATIONS

The benefit of U.S. Provisional Application Serial No. 60/380,434, filed May 14, 2002, is hereby claimed. This provisional application is hereby incorporated herein by reference in its entirety.

STATEMENT REGARDING FEDERALLY SPONSORED RESEARCH OR DEVELOPMENT

Not Applicable

BACKGROUND

This disclosure relates generally to emulsion water repellent compositions, including such compositions for use in conjunction with wood preservatives containing, for example, cupric-ammonia, cupric-amine, cupric-ammonia-amine complexes, quaternary ammonium compounds, or other systems. For example, the emulsion water repellent compositions are useful in Alkaline Copper-Quaternary ammonium (ACQ) preservative systems The following characterizations of certain patents and publications are provided for the convenience of the reader. No admission is made that the patents or publications are prior art, are material, or are accurate, or that the characterizations provided here can be relied upon to supplement the disclosures of the patents or publications, which speak for themselves.

Hydrocarbon emulsions have been used together with wood preservatives to impart water repellency and other benefits to the treated wood. U.S. Pat. No. 3,832,463 describes wax emulsions for wood preservatives containing hexavalent chromium. The main advantage asserted in that patent is said to be good compatibility with the preservative. Disadvantages are said to include the use of a hydrocarbon solvent which contributes to volatile organic compounds (VOC) and high cost, and possible poor shear stability.

U.S. Pat. No. 4,323,602 describes a process for making a ready-to-dilute water repellent and preservative composition for wood treatment. The composition of the paraffin wax emulsion used for the process is not disclosed or defined.

U.S. Pat. No. 6,274,199 describes water repellent compositions and processes for treating wood with water repellents and preservatives in a one-step processes. The patent indicates that it discloses a process and water repellent emulsion, which is stable under the process conditions, for the deep treatment of relatively refractory wood species. The emulsion can comprise:

(i) about 30–80 wt. % water;
(ii) about 10–50 wt. % of a hydrocarbon wax;
(iii) about 0.5–20 wt. % of at least one nonionic surfactant;
(iv) about 0–10 wt. % of an anionic surfactant;
(v) about 0–10 wt. % of an amphoteric surfactant; and
(vi) about 0–30 wt. % of an oil.

Example 1 of the '199 Patent describes a formulation prepared from the following ingredients:

| | |
|---|---|
| Nonylphenoxypoly (ethyleneoxy) ethanol (100 moles of ethylene oxide) | 3.89 wt. % |
| Nonylphenoxypoly (ethyleneoxy) ethanol (15 moles of ethylene oxide) | 1.85 wt. % |
| Sodium dodecylbenzenesulfonate | 0.44 wt. % |
| Slack wax | 25.00 wt. % |
| Neutral Oil | 7.50 wt. % |
| Water | 61.32 wt. % |

Organic acids solubilized in ammonia are described in U.S. Pat. No. 2,768,910 to improve water repellency and other physical properties of the treated wood. U.S. Pat. No. 3,945,835 states that ammonia solubilized organic acids can be used together with ammonia solubilized copper and zinc compounds to impart decay resistance and water repellency. Similarly, WO87/06177 describes the use of ammoniacal rosin solutions for wood treatment. The main disadvantages of using organic acid ammonium salts as water repellents are relative ineffectiveness and poor handling characteristics.

U.S. Pat. No. 4,681,910 discloses water repellent coating compositions containing latex and wax emulsions. The surfactant selection for the wax emulsions is not indicated to be critical. German Patent 2,415,843 disclosed a water repellent impregnating agent comprised of paraffin wax, a fatty acid, and beeswax for wood and other cellulosic materials.

The preparation of hydrocarbon emulsions using nonionic, anionic, cationic, or amphoteric surfactants or their mixtures is a well-known art in the field of surfactant and emulsion science. The book "Emulsions and Solubilization" by K. Shinoda and S. Friberg, Wiley-Interscience, 1986, states that the optimal HLB of nonionic surfactants for paraffin wax emulsions is 10. In U.S. Pat. No. 3,382,463, the desired HLB is said to be 7–11. Salts of various fatty acids, commonly know as soaps, are commonly used as inexpensive emulsifiers for wax emulsion water repellents for the wood composite board industry.

Other patents that may have some relevance are U.S. Pat. Nos. 4,465,613 and 4,497,919.

When wax emulsions were prepared according to well-known emulsion knowledge, it was discovered that while stable in freshly prepared alkaline copper preservative solutions, the emulsions were rapidly damaged after consecutive charges of wood treatment.

SUMMARY OF THE INVENTION

One aspect of the present invention is a wax emulsion water repellent composition, comprising:

a. a wax,
b. a nonionic surfactant having an HLB value greater than 11,
c. an anionic surfactant, present in an amount effective to stabilize said composition while it is used repetitively to pressure-treat wood; and
d. water.

The ingredients can be mixed and processed into a stable wax emulsion concentrate using known processing techniques such as homogenization or milling. The wax emulsion can have a small non-aqueous phase particle or droplet size for easy penetration of the wood to be treated and for long-term storage stability of the emulsion concentrate.

The emulsions, when mixed with a preservative, can provide good water repellency to the preservative treated wood. Because water absorption is reduced, the treated wood may be less prone to surface checking and cracking. Furthermore, the reduced surface checking and reduced moisture content due to the presence of the water repellent may enhance the performance of the preservative systems in exterior applications of the treated wood product such as decking, railing, and siding.

Another aspect of the invention is water-repellant wood comprising wood treated with a wax emulsion as described above.

Still another aspect of the invention is a method of treating wood, comprising providing wood and treating the wood with the wax emulsion as described above under conditions effective to increase its water repellency.

DETAILED DESCRIPTION

The current inventors believe, without intending to limit the claimed invention to operation according to this theory, that the interaction of the emulsion and wood, or more likely, the interaction of the emulsion and wood extractives under the specific conditions of wood treatment with alkaline preservatives such as ACQ, is responsible for the damage of the emulsions as the result of repetitive treatment of wood. The quaternary ammonium compounds in ACQ are also considered responsible for the destruction of wax emulsions. It has also been discovered that the spring-back solution obtained after a vacuum-pressure wood treatment process, known as a kickback solution in the wood treatment industry, could cause damage of the emulsions under static (non-wood treating) conditions. Simulated kickback solutions were used in this research to predict the stability of various emulsions.

The present wax emulsion compositions can be stable, optionally over a long term, in contact with alkaline copper and particularly ACQ preservatives under wood treatment conditions. The emulsion can be inexpensive and can provide good water repellency to the treated wood. The disclosed formulations are also suitable for preservatives containing quaternary ammonium compounds, such as borate/quaternary ammonium compounds with or without insecticides.

For the above noted compositions, the wax can be a petroleum paraffin wax, a natural wax, or a synthetic wax such as polyethylene wax or oxidized polyethylene wax, or their mixtures. The wax can be, for example, a slack wax having a melting point of 40–80° C., optionally having a melting point of 45–65° C. The wax is present in the amount of 5–40%, optionally 10–25%, based on the weight of the formulation.

The formulation can optionally contain a petroleum oil or a natural oil such as neutral oil or linseed oil. The petroleum oil can have a high flash point and negligible VOC content. The oil, if used, can be present in the amount of 1–5% based on the weight of the formulation, for example.

The formulation has at least one nonionic surfactant in the amount of 1–10%, optionally 3–7%, on a weight basis. The nonionic surfactant component can be a single surfactant or a mixture of two or more nonionic surfactants, the mixture having appropriate HLB values. Suitable nonionic surfactants include but are not limited to ethoxylated nonylphenols, ethoxylated alcohols, ethoxylated castor oil, polyethylene glycol fatty acid esters, and ethyleneglycol-propyleneglycol copolymers. The contemplated nonionic surfactants include ethoxylated nonylphenols and polyethylene glycol fatty acid esters having HLB values of greater than 11, alternatively 14–19, alternatively 15–18. When mixtures of nonionic surfactants are used, the HLB value of each component surfactant does not have to fall in a stated range as long as the system HLB, calculated based on the percentages of the components and their HLB values, is within the stated range.

It was unexpectedly discovered that the emulsions have poor stability in alkaline copper, particularly ACQ, preservative systems when the nonionic surfactants have HLB values that are commonly considered optimal for wax emulsions. For example, emulsions containing ethoxylated nonylphenol with 6 moles of ethylene oxide (such as Ethal NP-6 from Ethox Chemicals, LLC, Greenville, S.C., HLB=10.9) as the nonionic surfactant were unstable under certain tested conditions. The emulsion stability increased as the HLB values of the nonionic surfactants increased.

The presence of one or more anionic surfactants in addition to the nonionic surfactants in the formulation has been found to increase, and in some instances drastically increase, the stability of the wax emulsion in an alkaline copper preservative, for example in an ACQ preservative. The anionic surfactant is present in the range of 0.2–10%, alternatively 1–5%, based on the weight of the formulation.

Suitable anionic surfactants include but are not limited to the alkali metal (for example sodium or potassium), ammonium, alkaline earth metal (for example calcium), or organic amine salts of alkylaryl sulfonates, alkyl sulfonates, fatty alcohol sulfates, sulfocarboxylic acids and derivatives, natural or synthetic carboxylic acids or mixtures of any of the described anionic surfactants. The alkyl or fatty groups defined herein may have from 8 to 22 carbon atoms, more typically predominantly from 12 to 18 carbon atoms. Suitable anionic surfactants include the sodium, potassium, ammonium, or organic amine salts of synthetic or natural carboxylic acids such as stearic acid, myristic acid, palmitic acid, oleic acid, linoleic acid, isostearic acid, or alkenylsuccinic acid. The anionic surfactants can also be salts of acid mixtures such as tallow acids or vegetable (such as coconut) fatty acids. The carboxylate anionic function can also be an integral part of the wax such as in the case of oxidized polyethylene wax. The contemplated anionic surfactants include the monoethanolamine salts of oleic acid or isostearic acid.

Water is present in the formulation in the range of 50–80%, alternatively in the range of 60–70%. Water contents outside this range are also contemplated.

Optionally, the formulation contains a micro-biocide to prevent biological deterioration during storage. The formulation can optionally further contain a colorant and other property enhancing agents.

The present formulations can be used together with all alkaline copper based wood preservatives such as ammoniacal copper carboxylates, alkaline copper-quaternary (ACQ) preservatives (where the quaternary ammonium compounds can be defined as set out in the next paragraph), ammoniacal copper-zinc-arsenate (ACZA), and copper-triazole based preservatives.

The formulations can employ quaternary ammonium compounds including any suitable anion, for example, halide (such as chloride), sulfate, alkylsulfate, carbonate, bicarbonate, and others.

The contemplated quaternary ammonium compounds include dialkyldimethyl quaternary ammonium compounds having two alkyl chains, or alkylbenzyldimethyl quaternary ammonium compounds having one alkyl chain, each alkyl substituent in either case having an average alkyl chain length of from 8 to 18 carbon atoms. The alkyl groups can be natural fatty acid residues, such as coconut alkyl or tallow alkyl moieties. The contemplated quaternary ammonium compounds include alkyldimethylbenzylammonium chloride (ADBAC), didecyldimethylammonium chloride (DDAC), ADBAC plus borates, DDAC plus borates, and DDAC plus borates and insecticides such as Imidacloprid from Bayer Corporation. The borates for the preservatives described above include but are not limited to the sodium, potassium, and ammonium salts of boric acid and polyborates. One contemplated borate is disodium octaborate tetrahydrate, $Na_2B_8O_{13} \cdot 4H_2O$. Other quaternary ammonium compounds known to be useful in wood preservative compositions are also contemplated here.

The water repellent emulsion can be added to the preservative solution for one-step treatments or alternatively, the water repellent emulsion can be used as a secondary treatment following treatment with a wood preservative.

EXAMPLE 1

An emulsion concentrate is prepared by mixing the following ingredients at 85° C. followed by homogenization in a Gaulin homogenizer. The anionic surfactant in this and other examples is made by adding oleic acid and monoethanolamine, which are believed to form an anionic surfactant in situ.

| | |
|---|---|
| Slack wax | 17.5% |
| Neutral oil | 3.5% |
| Ethoxylated nonylphenol (9 moles of ethylene oxide) | 2% |
| Ethoxylated nonylphenol (15 moles of ethylene oxide) | 3% |
| Oleic acid | 3.33% |
| Monoethanolamine | 0.72% |
| Water | balance |

EXAMPLE 2

An emulsion concentrate is prepared by mixing the following ingredients at 85° C. followed by homogenization on a Gaulin homogenizer.

| | |
|---|---|
| Slack wax | 17.5% |
| Neutral oil | 3.5% |
| Ethoxylated nonylphenol (15 moles of ethylene oxide) | 5% |
| Oleic acid | 3.33% |
| Monoethanolamine | 0.72% |
| Water | balance |

EXAMPLE 3

An emulsion concentrate is prepared by mixing the following ingredients at 85° C. followed by homogenization on a Gaulin homogenizer.

| | |
|---|---|
| Slack wax | 17.5% |
| Neutral oil | 3.5% |
| Ethoxylated nonylphenol (20 moles of ethylene oxide) | 5% |
| Oleic acid | 3.33% |
| Monoethanolamine | 0.72% |
| Water | balance |

EXAMPLE 4

An emulsion concentrate is prepared by mixing the following ingredients at 85° C. followed by homogenization on a Gaulin homogenizer.

| | |
|---|---|
| Slack wax | 17.5% |
| Neutral oil | 3.5% |
| Ethoxylated nonylphenol (15 moles of ethylene oxide) | 1% |
| Ethoxylated nonylphenol (100 moles of ethylene oxide) | 4% |
| Oleic acid | 3.33% |
| Monoethanolamine | 0.72% |
| Water | balance |

The emulsion concentrates thus obtained have a median particle size ("particle" as used herein refers to a solid particle, a droplet of a dispersed phase, or both) of less than 0.4 microns (400 nm) and have good long-term storage stability. The following example illustrates the use of the water repellent emulsion in a typical wood treatment solution.

EXAMPLE 5

A typical wood treatment solution containing emulsion concentrate according to Example 4 and ACQ preservative is prepared according to the following:

| | |
|---|---|
| Wax emulsion (According to Example 4) | 4 wt. % |
| ACQ | 1.0 wt. % active ingredient |
| Water | balance |

After treating with the above described solution according to common industrial practices followed by drying, the treated wood is resistant to water damage, decay, and insect attack.

EXAMPLE 6

Particle size change of various emulsions in ACQ preservatives in the presence of "kickback" solutions are presented in this example. The effect of surfactant on emulsion stability (represented by a slow rate of average particle size increase) is clearly illustrated.

| | Storage Time (days) | | | |
|---|---|---|---|---|
| | 3 | 7 | 14 | 21 |
| Example | Median particle size of emulsions (microns) | | | |
| Example 1 | 0.39 | 0.43 | 0.45 | 0.45 |
| Example 2 | 0.37 | 0.38 | 0.41 | 0.42 |
| Example 3 | 0.38 | 0.39 | 0.39 | 0.40 |

What is claimed is:
1. A wax emulsion water repellent composition, comprising:
   a. a wax,
   b. a nonionic surfactant having an HLB value greater than 11,
   c. an anionic surfactant comprising a monoethanolamine salt of a natural or synthetic carboxylic acid, present in an amount effective to stabilize said composition while it is used repetitively to pressure-treat wood; and d. water.

2. The wax emulsion of claim 1, wherein said wax is slack wax.

3. The wax emulsion of claim 1, wherein said nonionic surfactant comprises an ethoxylated nonylphenol or fatty acid derivative having an HLB value of 15–17.

4. The wax emulsion of claim 1, further comprising a wood preservative.

5. The wax emulsion of claim 4, wherein said wood preservative is selected from ammoniacal copper carboxylates, alkaline copper-quaternary preservatives, copper-triazole based preservatives, ammoniacal copper-zinc-arsenate preservatives, quaternary ammonium preservatives, and combinations thereof.

6. The wax emulsion of claim 4, wherein said wood preservative is a quaternary ammonium preservative or an alkaline copper-quaternary preservative.

7. The wax emulsion of claim 6, wherein said quaternary ammonium wood preservative or quaternary component of an alkaline copper-quaternary preservative is the salt of a quaternary ammonium cation and an anion, wherein said cation is selected from a dimethyl dialkyl ammonium compound or a dimethyl benzyl alkyl ammonium compound, wherein each alkyl group is independently selected from alkyl groups having an average chain length of from 8 to 18 carbon atoms.

8. The wax emulsion of claim 7, where said anion is selected from chloride, carbonate, bicarbonate, methylcarbonate, sulfate, bisulfate, or methylsulfate.

9. The wax emulsion of claim 1, processed in a Gaulin homogenizer.

10. Water-repellant wood comprising wood treated with a wax emulsion water repellent composition comprising:
    a. a wax,
    b. a nonionic surfactant having an average HLB value greater than 11,
    c. an anionic surfactant comprising a monoethanolamine salt of a natural or synthetic carboxylic acid, present in an amount effective to stabilize said composition while it is used repetitively to pressure-treat wood; and
    d. water.

11. A method of treating wood, comprising providing wood and treating the wood with the wax emulsion of claim 1 under conditions effective to increase its water repellency.

* * * * *